US008233587B2

(12) United States Patent
Sato et al.

(10) Patent No.: US 8,233,587 B2

(45) Date of Patent: Jul. 31, 2012

(54) SOURCE GRATING FOR TALBOT-LAU-TYPE INTERFEROMETER

(75) Inventors: Genta Sato, Kawasaki (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 12/755,333

(22) Filed: Apr. 6, 2010

(65) Prior Publication Data

US 2010/0260315 A1 Oct. 14, 2010

(30) Foreign Application Priority Data

Apr. 10, 2009 (JP) ................................ 2009-096141

(51) Int. Cl.
*G03H 5/00* (2006.01)

(52) U.S. Cl. ........................................... 378/36; 378/62

(58) Field of Classification Search ........................ None
See application file for complete search history.

(56) References Cited

U.S. PATENT DOCUMENTS

| | | | | |
|---|---|---|---|---|
| 6,381,072 | B1 * | 4/2002 | Burger | 359/622 |
| 2003/0235272 | A1 * | 12/2003 | Appleby et al. | 378/147 |
| 2008/0219297 | A1 | 9/2008 | Yamada | |

FOREIGN PATENT DOCUMENTS

WO 2007-032094 A1 3/2007

* cited by examiner

*Primary Examiner* — Hoon Song

(74) *Attorney, Agent, or Firm* — Canon U.S.A., Inc. IP Division

(57) ABSTRACT

A source grating for a Talbot-Lau-type interferometer includes a plurality of channels having incident apertures provided on a side irradiated with X-rays and exit apertures provided on an opposite side of the side irradiated with the X-rays; the exit apertures of the channels have an aperture area smaller than an aperture area of the incident apertures; and the exit apertures of the channels are arranged so that interference fringes of Talbot self-images formed by X-rays exiting from the exit apertures of the adjacent channels are aligned with each other.

18 Claims, 14 Drawing Sheets

SOURCE GRATING FOR TALBOT-LAU-TYPE INTERFEROMETER

BACKGROUND OF THE INVENTION

1. Field of the Invention

The present invention relates to a source grating for use in phase contrast imaging using X-rays, especially in a Talbot-Lau-type interferometer.

2. Description of the Related Art

In the medical field, phase contrast imaging for forming an image using phase variation of X-rays passing through a sample has been researched because this imaging method achieves both reduction of radiation exposure and high-contrast imaging.

International Publication No. WO2007/32094 proposes a Talbot-Lau-type interferometer in which a source grating is provided between a normal X-ray source having a large focus size and a sample and in which Talbot interference is observed with the X-ray source. In Talbot interference, a source grating refers to a grating in which areas for transmitting X-rays and areas for blocking X-rays are periodically arranged in one direction or two directions. The WO2007/32094 publication asserts that the above-described Talbot-Lau-type interferometer allows Talbot interference to be observed with a normal X-ray source.

A Talbot-Lau-type interferometer needs an X-ray source having high spatial coherence. Since the spatial coherence increases as the size of the X-ray source decreases, a Talbot-Lau-type interferometer of the related art satisfies the condition of spatial coherence by a structure in which a source grating having a small aperture width is provided just behind the X-ray source. Unfortunately, because its small aperture width, the source grating of the related art blocks most X-rays applied thereon. For this reason, when the source grating disclosed in the above publication is used, the X-ray quantity is not always sufficient to realize high-contrast imaging with high-energy X-rays for medical use. That is, the source grating of the WO2007/32094 publication may not produce the short-wavelength X-rays and high spatial coherence necessary for medical use.

SUMMARY OF THE INVENTION

The present invention provides a source grating for a Talbot-Lau-type interferometer, which satisfies a condition of a Talbot-Lau interference method used in phase contrast imaging and which obtains a sufficient X-ray quantity with a high X-ray transmittance.

A source grating for a Talbot-Lau-type interferometer of the present invention includes a plurality of channels including incident apertures provided on a side irradiated with X-rays and exit apertures provided on an opposite side of the side irradiated with the X-rays. The exit apertures have an aperture area smaller than that of the incident apertures. The exit apertures of the channels are arranged so that interference fringes of Talbot self-images formed by X-rays exiting from the exit apertures of adjacent channels are aligned with each other.

Further features of the present invention will become apparent from the following description of exemplary embodiments with reference to the attached drawings.

DESCRIPTION OF THE EMBODIMENTS

First Embodiment

A source grating for a Talbot-Lau-type interferometer according to a first embodiment of the present invention will now be described with reference to FIGS. 1 to 3.

Figure 1:
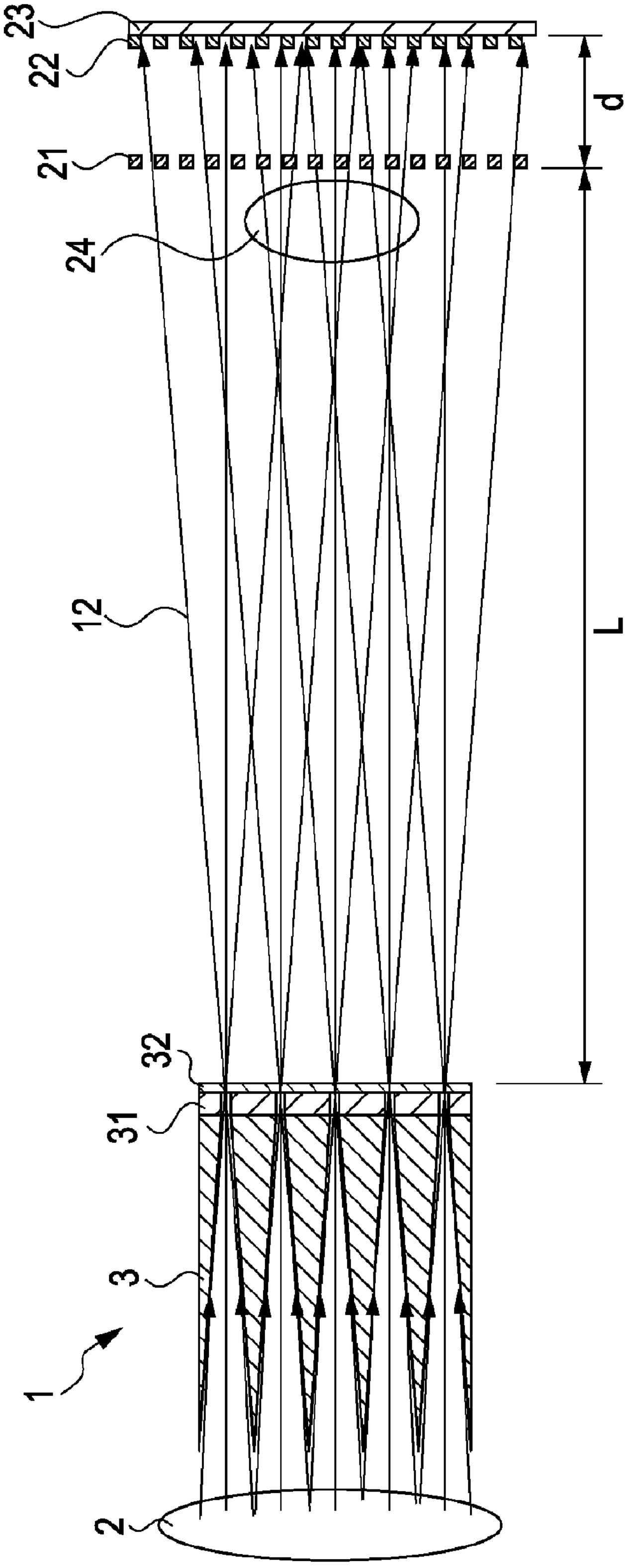
FIG. 1 illustrates a configuration of a Talbot-Lau-type interferometer including a source grating according to a first embodiment of the present invention.

FIG. 1 illustrates a configuration of a Talbot-Lau-type interferometer of the first embodiment. Referring to FIG. 1, the Talbot-Lau-type interferometer includes a source grating 1, an X-ray source 2, a sample 24, a phase grating 21, an absorption grating 22, and an X-ray detector 23.

As shown in FIG. 1, the source grating 1 is located on an X-ray emitting side of the X-ray source 2. Although a detailed structure will be described below, the source grating 1 has apertures through which X-rays pass. X-rays emitted from the X-ray source 2 partly pass through the apertures of the source grating 1, and are applied onto the sample 24 or the phase grating 21.

The phase grating 21 is located at a distance L from the source grating 1 on a side opposite the X-ray source 2. In the first embodiment, the phase grating 21 is a one-dimensional or two-dimensional diffraction grating in which two types of areas having different thicknesses are arranged alternately. X-ray beams passing through these areas having different thicknesses are emitted with the phase modulated to $\pi$ or $\pi/2$, because the distances of the X-ray beams path are different.

X-ray beams 12 exiting from the apertures of the source grating 1 cause interfere by the phase grating 21 when the spatial coherence thereof is sufficiently high. Then, interference fringes in which the shape of the phase grating 21 is reflected appear at a specific distance from the phase grating 21. These interference fringes are called a Talbot self-image, and appear at a distance of (P1×P1/(2λ)×n or (P1×P1/(8λ)×n from the phase grating 21. A distance between the phase grating 21 and the position where the Talbot self-image appears is referred to as a Talbot distance zt. Here, n is an integer.

A pitch Ps of the interference fringes in the Talbot self-image is determined by a pitch P1 of the phase grating 21. The pitch Ps of the interference fringes is given by the following Expression (1) when X-ray beams passing through the phase grating 21 are parallel X-ray beams, and the following Expression (2) when X-ray beams passing through the phase grating 21 are spherical X-ray beams.

$$Ps = \frac{1}{2}P_1 \qquad (1)$$

$$Ps = \frac{1}{2}P_1 \times \frac{d+L}{L} \qquad (2)$$

where d represents the distance between the phase grating 21 and the X-ray detector 23.

In phase contrast imaging using the Talbot-Lau-type interferometer, the sample 24 is set between the X-ray source 2 and the phase grating 21. When the sample 24 is set before the phase grating 21, that is, on the X-ray source side of the phase grating 21, the X-ray beams 12 exiting from the source grating 1 are refracted by the sample 24. Hence, a Talbot self-image formed by the X-ray beams 12 exiting from the source grating 1 includes differential information about phase variation of the X-ray beams 12 due to the sample 24.

The X-ray detector 23 is located in a manner such that the distance d between the phase grating 21 and the X-ray detector 23 is equal to the Talbot distance zt. By detecting a Talbot self-image with the X-ray detector 23 thus located, a phase image of the sample 24 can be obtained.

To detect a Talbot self-image with a sufficient contrast, an X-ray image detector having a high spatial resolution is necessary. Accordingly, the absorption grating 22 is used to detect a Talbot self-image even when the spatial resolution of the X-ray detector 23 is low. The absorption grating 22 is a one-dimensional or two-dimensional diffraction grating in which absorbing portions for sufficiently absorbing the X-ray beams 12 and transmitting portions for transmitting the X-ray beams 12 are arranged alternately and periodically. A pitch P2 of the absorption grating 22 is substantially equal to the pitch Ps of the interference fringes in the Talbot self-image. When the absorption grating 22 is located just before the X-ray detector 23, a Talbot self-image formed by the X-ray beams 12 passing through the phase grating 21 is detected as Moire fringes. Information about phase variation can be detected as deformation of the Moire fringes.

A phase contrast image of the sample 24 can be obtained by detecting the change of the Moire fringes with the X-ray detector 23 in the above-described state in which the distance d between the phase grating 21 and the absorption grating 22 is equal to the Talbot distance zt and the X-ray detector 23 and the absorption grating 22 are in close contact with each other.

Figure 2:
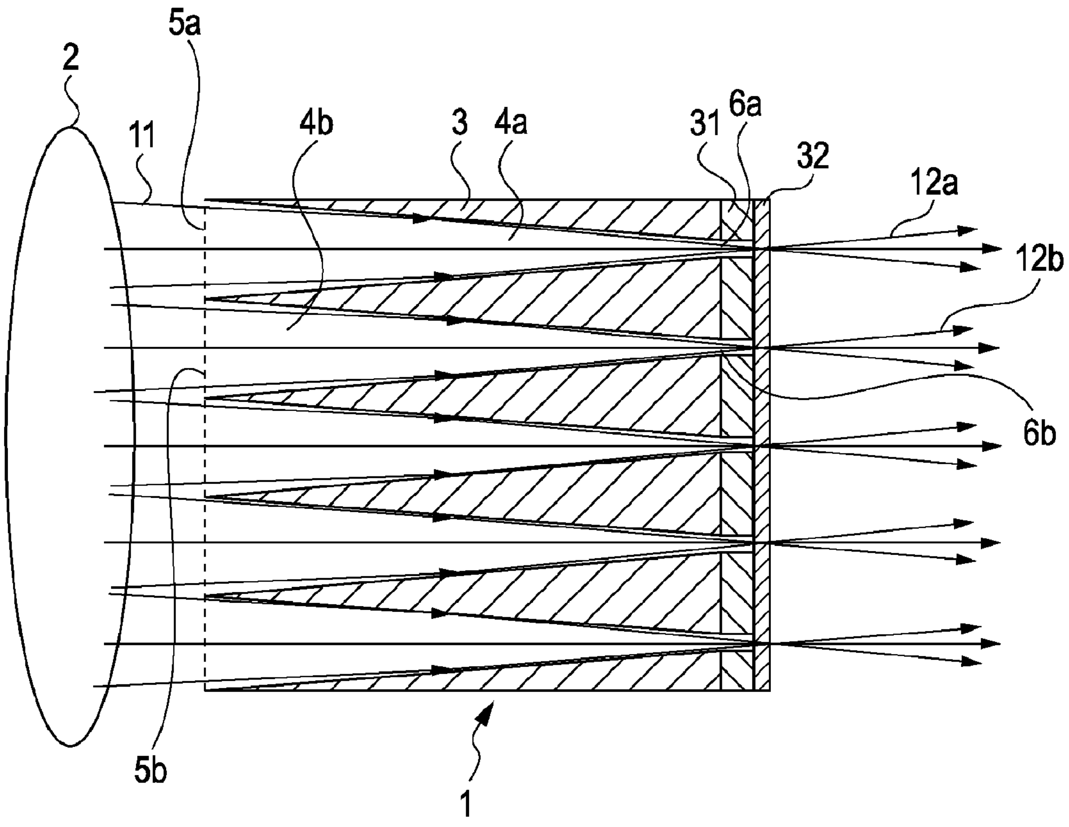
FIG. 2 is a schematic sectional view of the source grating of the first embodiment.

FIG. 2 is a schematic sectional view illustrating a structure of the source grating 1 of the first embodiment. The source grating 1 includes a guide tube 3, a shielding grid 31, and an X-ray filter 32. The shielding grid 31 and the X-ray filter 32 are added optionally.

Figure 3A:
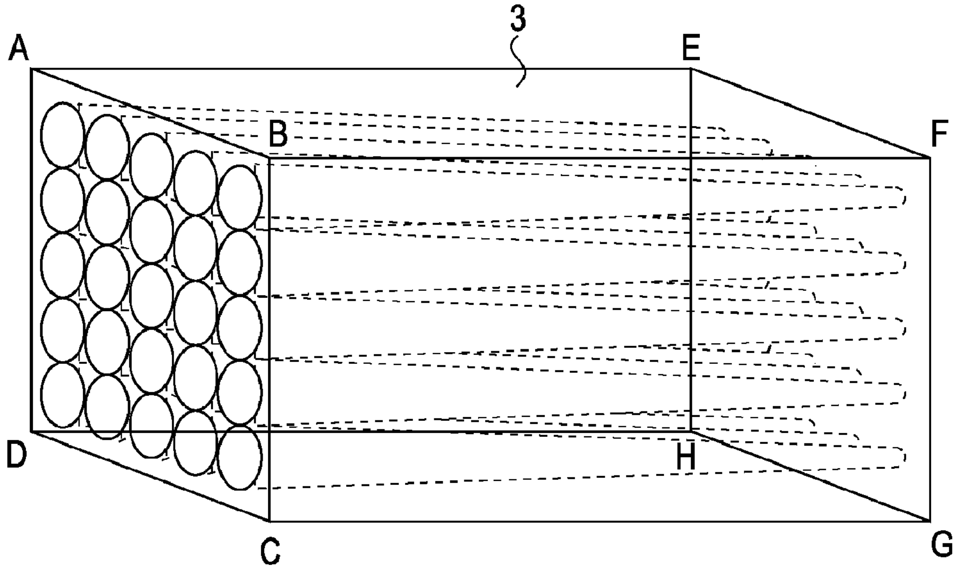
FIG. 3A is a schematic perspective view of the source grating of the first embodiment.
Figure 3B:
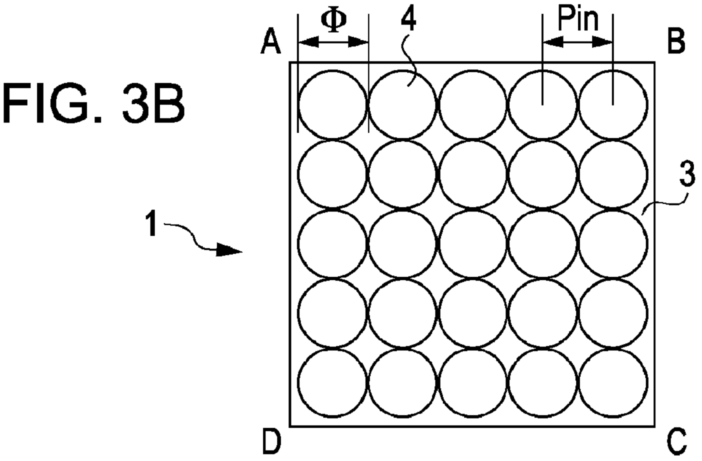
FIGS. 3B and 3C are schematic front views of incident and exit apertures, respectively, of the source grating.
Figure 3C:
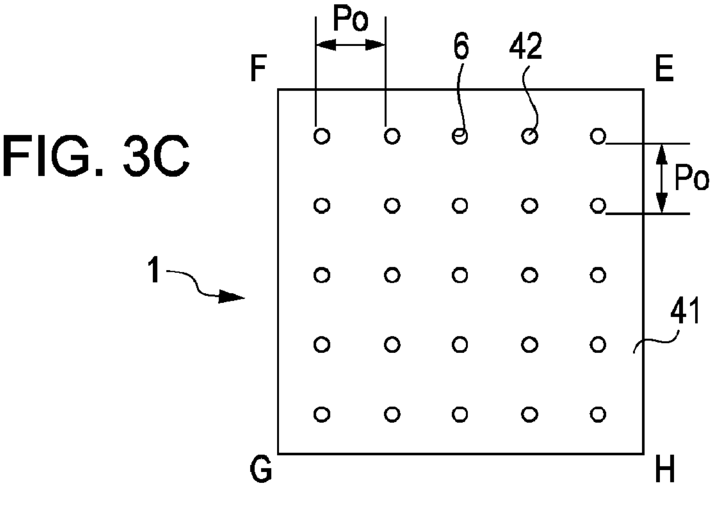

FIG. 3A is a schematic perspective view illustrating a structure of the guide tube 3. Referring to FIG. 3A, a surface ABCD of the guide tube 3 corresponds to a side irradiated with X-ray beams 11 from the X-ray source 2, and an opposite surface EFGH corresponds to a sample side. FIG. 3B is a front view of the surface ABCD, and FIG. 3C is a front view of the surface EFGH.

The guide tube 3 includes a plurality of hollow channels penetrating from one surface to the other surface. Channels 4*a* and 4*b* shown in FIG. 2 respectively have incident apertures 5*a* and 5*b* provided in the side irradiated with the X-ray beams 11 from the X-ray source 2, that is, the surface ABCD (FIG. 3B), and exit apertures 6*a* an 6*b* in the opposite side, that is, the surface EFGH (FIG. 3C). In each channel, the aperture area of the incident aperture is larger than that of the exit aperture. In the first embodiment, the channels 4 are each shaped like a truncated cone. As illustrated, the source grating 1 has a channel group including the channels 4*a* and 4*b* and a plurality of adjacent channels having almost the same shape (cross-section and length) as that of the channels 4*a* and 4*b*.

The exit apertures 6 of the channels are arranged to satisfy the condition of the Talbot-Lau-type interferometer. In other words, the exit apertures 6*a* and 6*b* of the two channels 4*a* and 4*b* are arranged in a manner such that interference fringes of a Talbot self-image formed by X-ray beams 12*a* exiting from the exit aperture 6*a* of the channel 4*a* are aligned with interference fringes of a Talbot self-image formed by X-ray beams 12*b* exiting from the exit aperture 6*b* of the channel 4*b*.

Figure 4A:
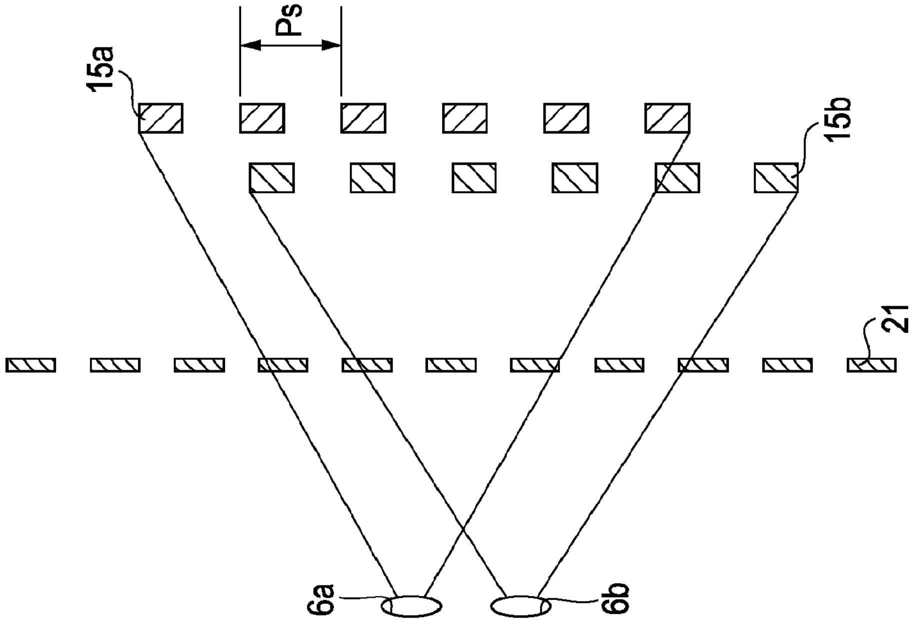
FIGS. 4A and 4B are schematic views of Talbot self-images formed by X-rays exiting from exit apertures of the source grating of the first embodiment.
Figure 4B:
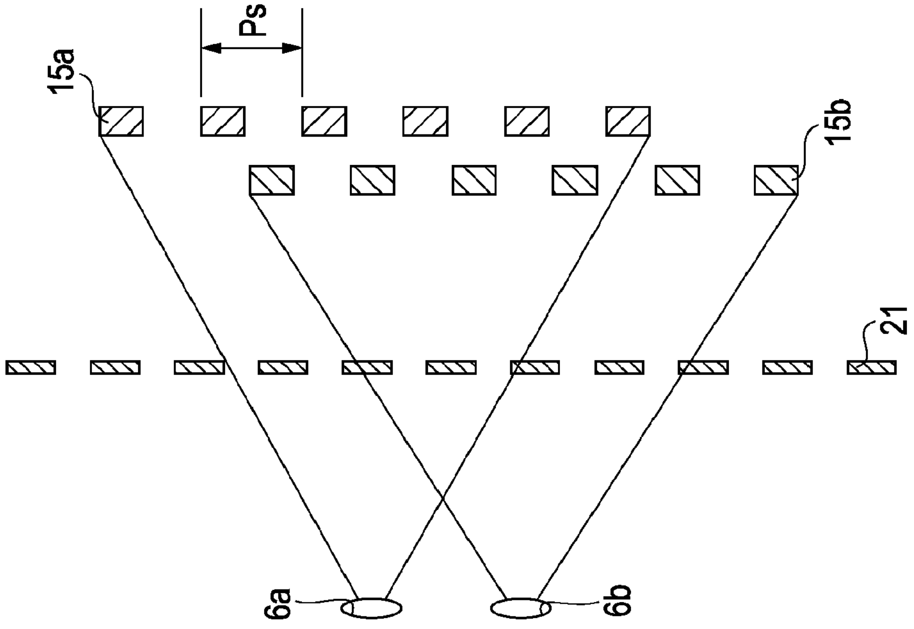

With reference to FIG. 4, a description will be given of alignment of Talbot self-images formed by the X-ray beams 12*a* and 12*b* exiting from the exit apertures 6*a* and 6*b*, respectively. FIGS. 4A and 4B schematically illustrate the exit apertures 6*a* and 6*b* of the source grating 1, the phase grating 21 of the Talbot-Lau-type interferometer, and Talbot self-images 15*a* and 15*b* formed by X-ray beams that cause interfere by the phase grating 21. In FIGS. 4A and 4B, the Talbot self-image 15*a* is defined by six fringes arranged at the pitch Ps. The Talbot self-image 15*b* is shown similarly. While the two Talbot self-images are separated for convenience in FIGS. 4A and 4B, in actuality, they are formed on planes at the same distance from the phase grating 21.

FIG. 4A is a schematic view illustrating a state in which the Talbot self-images 15*a* and 15*b* formed by the X-ray beams 12*a* and 12*b* exiting from the exit apertures 6*a* and 6*b* are aligned with each other. The Talbot self-image 15*a* is formed by the X-ray beam 12*a* exiting from the exit aperture 6*a*, and the Talbot self-image 15*b* is formed by the X-ray beam 12*b* exiting from the exit aperture 6*b*. Referring to FIG. 4A, the interference fringes of the two Talbot self-images 15*a* and 15*b* are aligned with each other. The interference fringes do not always need to lap over the whole region, and phase contrast imaging can be performed with the Talbot-Lau-type interferometer as long as the interference fringes are aligned and overlap partially each other, as illustrated.

In contrast, FIG. 4B illustrates a state in which Talbot self-images 15*a* and 15*b* formed by the X-ray beams 12*a* and 12*b* exiting from the exit apertures 6*a* and 6*b* are not aligned with each other. In FIG. 4B, interference fringes of the Talbot self-image 15*a* and interference fringes of the Talbot self-image 15*b* are arranged alternately. For this reason, the interference fringes of the two Talbot self-images 15*a* and 15*b* are not aligned with each other.

The exit apertures of all channels are arranged in a manner such that interference fringes of Talbot self-images formed by the X-ray beams exiting from the exit apertures of the adjacent channels are aligned with each other, as described above.

To satisfy the above-described condition that the Talbot self-images are aligned, it is preferable that the exit apertures 6 of the channels in the configuration of the Talbot-Lau-type interferometer shown in FIG. 1 be arranged at a pitch Po that satisfies the following Expression (3). Here, n represents a natural number, Ps represents the pitch of interference fringes in a Talbot self-image, L represents the distance between the source grating 1 and phase grating 21, and d represents the distance between the phase grating 21 and the absorption grating 22. The pitch does not always need to exactly satisfy Expression (3), and it is only necessary that the pitch allows the interference fringes of the Talbot self-images to be substantially aligned with each other.

$$Po = n \times Ps \times \frac{L}{d} \tag{3}$$

Preferably, the direction in which the exit apertures 6 are arranged is the same as the direction of the grating pitch of the phase grating 21.

FIG. 3B illustrates a front view of the surface ABCD of the source grating 1 upon which X-ray beams are incident. In the surface ABCD shown in FIG. 3B, the channels 4 are arranged at a pitch Pin. In the present invention, the pitch Pin may be equal to or different from the pitch Po of the exit apertures.

While twenty-five channels are provided in the embodiment shown in FIG. 3A, the number of channels is not limited thereto, and it is only necessary that a plurality of channels are provided. Further, while the apertures are arranged in the form of a square grating in FIGS. 3B and 3C, the present invention is not limited to such an arrangement. In the source grating of the Talbot-Lau-type interferometer of the present invention, it is only necessary that the exit apertures are arranged in a manner such that interference fringes of Talbot self-images are aligned with each other, as described above.

Next, the operation obtained by the configuration of the embodiment will be described with reference to FIG. 2. An inner surface of each channel 4 has a flatness such as to totally reflect X-rays. An X-ray beam 11 from the X-ray source 2 enters the channel 4 from the incident aperture 5*a*, 5*b* provided in the surface ABCD of the guide tube 3, and part of the X-ray beam 11 exits from the exit aperture 6 provided in the surface EFGH without being totally reflected by the inner surface of the channel 4. The other part of the incident X-ray beam 11 is totally reflected by the inner surface of the channel 4 once or a plurality of times, and exits from the exit aperture 6. In other words, since the aperture area of the incident aperture 5*a*, 5*b* is larger than the aperture area of the exit aperture 6, the channel 4 converges the incident X-ray toward the exit aperture 6. That is, the channel 4 concentrates the intensity of the X-ray beam 11 from a first intensity distribution at incident aperture 5*a*, 5*b* to a second intensity distribution at exit aperture 6. For this reason, the intensity per unit area of the X-ray passing through the exit aperture 6 is larger than the intensity per unit area of the X-ray beam passing through the incident aperture 5*a*, 5*b*.

FIG. 3C shows an X-ray intensity distribution of the surface EFGH. Reference numeral 41 denotes a low-intensity area where the X-ray intensity is low, and reference numeral 42 denotes high-intensity areas where the X-ray intensity is high. Because of the above-described convergence effect of the channel 4, the X-ray intensity per unit area near the exit apertures is larger than the X-ray intensity per unit area before incidence. Conversely, the X-ray intensity per unit area is small in the area except the exit apertures. For this reason, the high-intensity areas 42 where the X-ray intensity is high are dotted in the low-intensity area 41 where the X-ray intensity is low in the surface EFGH. The high-intensity areas 42 are arranged at the same pitch Po as that of the exit apertures of the channels. Further, the high-intensity areas 42 have a shape that conforms to the shape of the exit apertures 6 of the channels.

As described above, the X-ray beams 11 applied onto the source grating 1 of the embodiment enter the channels 4 from the incident apertures 5*a* and 5*b* having a large aperture area, and are converged at the exit apertures 6 having a size on the order of micrometer. Therefore, the incident X-ray beams 11 can pass through the source grating 1 with a high transmittance.

By combination with the high-intensity X-ray source having a large focus size, a radiation source that easily generates a large quantity of X-rays and that has a spatial coherence equivalent to that of an X-ray source having a size on the order of micrometer can be provided. This allows high-contrast phase contrast imaging.

First Modification of First Embodiment

Figure 5A:
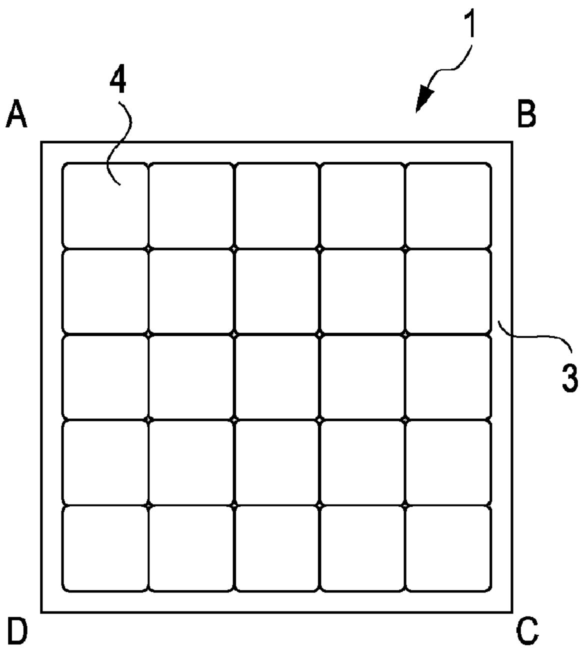
FIGS. 5A and 5B are schematic front views of a source grating according to a first modification of the first embodiment.
Figure 5B:
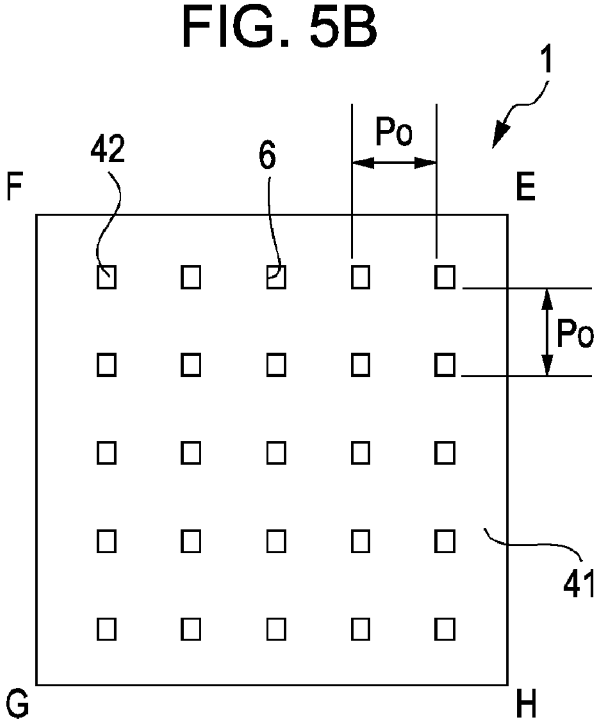

The shape of the incident apertures 5 of the channels 4 in the surface ABCD is not limited to a circular cross-section as illustrated in FIGS. 3A and 3B. For example, square incident apertures as shown in FIG. 5A may be provided based on specific application requirements. When circles are laid in a certain plane, spaces are formed between the circles. In contrast, squares can fill the plane with little space therebetween. Therefore, when the incident apertures are square, the ratio of the total aperture area of the incident apertures to the cross-sectional area of the surface ABCD can be higher than when the incident apertures are circular. Similarly, the shape of the exit apertures 6 can also be determined arbitrarily.

By increasing the ratio of the total aperture area of the incident apertures on the source side, more incident X-rays can be converged at the exit apertures. This further increases the transmittance.

Second Modification of First Embodiment

Figure 6A:
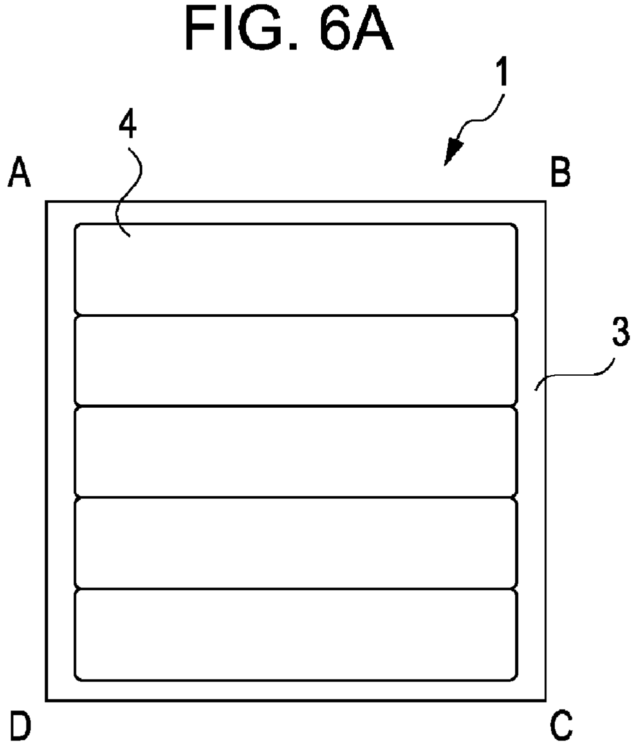
FIGS. 6A and 6B are schematic front views of a source grating according to a second modification of the first embodiment.
Figure 6B:
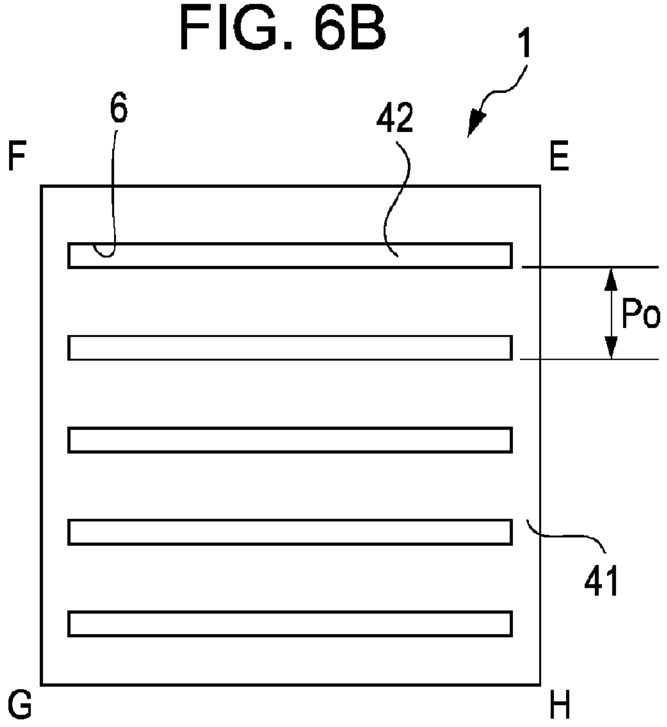

In the above-described embodiment, the channels 4 in the guide tube 3 are two-dimensionally arranged, as shown in FIGS. 3A-3C or 5A-5B. In the source grating 1 of the present invention, channels 4 may also be one-dimensionally arranged, as shown in FIG. 6A. In a one-dimensional source grating 1 shown in FIG. 6B, channels 4 are arranged at a pitch Po in a direction of the short sides of the cross sections of the channels 4.

In the configuration of the Talbot-Lau-type interferometer shown in FIG. 1, a one-dimensional source grating may be used when the phase grating 21 is a one-dimensional grating, and a two-dimensional source grating may be used when the phase grating 21 is a two-dimensional grating. In the illustrations of FIGS. 5A-6B, the same numerical references as those of FIGS. 3A-3C represent similar functions. Thus, description thereof has been omitted for brevity.

Second Embodiment

The source grating for the Talbot-Lau-type interferometer of the present invention may include channels that are different in the aperture area of the incident apertures from the other channels. A source grating for a Talbot-Lau-type interferometer according to a second embodiment of the present invention will be described with reference to FIGS. 7A to 7D.

A source grating 1 of the Talbot-Lau-type interferometer of the second embodiment includes first channels having first incident apertures, and second channels having second incident apertures. The second apertures of the second channels may have an aperture area larger than that of incident apertures of the first channels. The second channels are located farther from the center of a side irradiated with X-rays than the first channels.

Figure 7A:
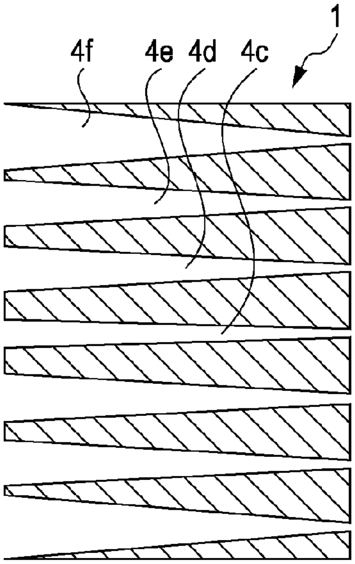
FIGS. 7A to 7D illustrate a source grating according to a second embodiment of the present invention, in which incident apertures having different aperture areas are arranged.
Figure 7B:
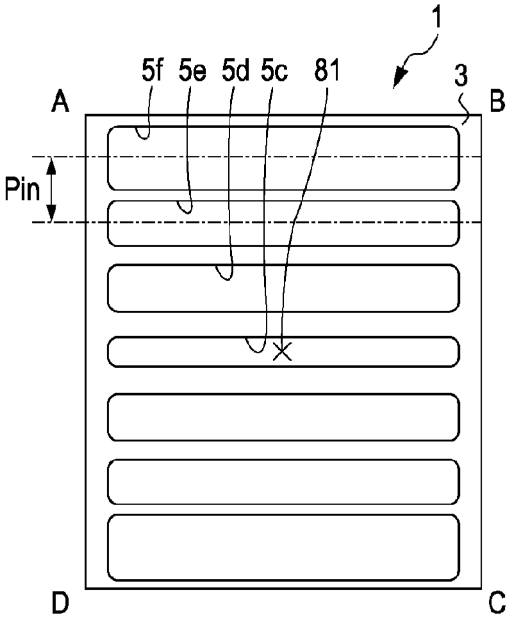

FIG. 7A is a schematic sectional view of a guide tube 3 of the second embodiment; and FIG. 7B is a front view of a surface ABCD of the source grating 1 upon which X-rays are incident. In FIG. 7B, reference numeral 81 denotes the center of the surface ABCD. In the surface ABCD, an incident aperture 5*f* having an aperture area larger than that of an incident aperture 5*c* is located farther from the center 81 than the incident aperture 5*c*.

As shown in FIG. 7B, the incident apertures in the surface ABCD may include incident apertures having the same area, for example, incident apertures 5*d* and 5*e*. Alternatively, the incident apertures in the surface ABCD may be arranged to satisfy the condition that one of the two arbitrary adjacent incident apertures that is located farther from the center has an aperture area larger than that of the other incident aperture.

Figure 7C:
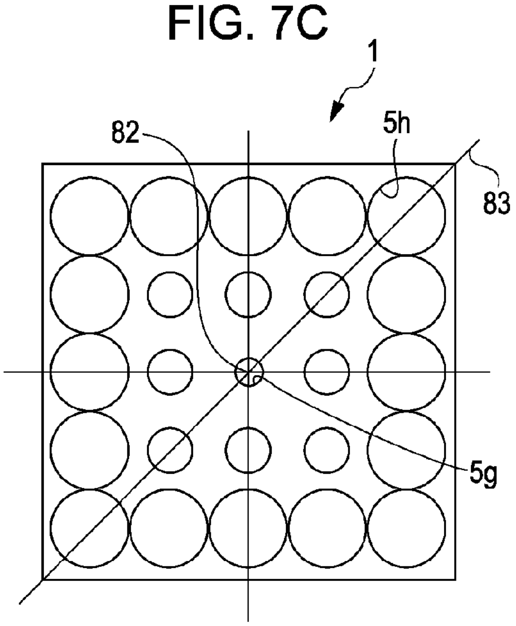
Figure 7D:
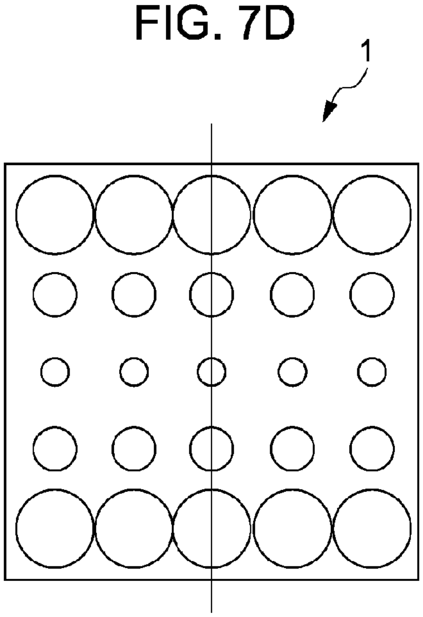

While FIG. 7B shows a one-dimensional source grating, arrangements of incident apertures in a two-dimensional source grating are possible as shown in FIGS. 7C and 7D. FIGS. 7C and 7D show a surface ABCD of the two-dimensional source grating upon which X-rays are incident. In FIG. 7C, reference numeral 82 denotes the center of the surface ABCD. Referring to FIG. 7C, on a straight line 83 passing through the center 82, an incident aperture 5*h* having an aperture area larger than that of an incident aperture 5*g* is located farther from the center 82 than the incident aperture 5*g*.

Incident apertures on the straight line 83 may include a plurality of incident apertures having the same aperture area. Alternatively, the incident apertures on the straight line 83 may be arranged to satisfy the condition that one of the two arbitrary adjacent incident apertures that is farther from the center has an aperture area larger than that of the other incident aperture.

The straight line 83 may be parallel to the vertical axis or the horizontal axis of the surface ABCD or parallel to a diagonal of the surface ABCD. Alternatively, as shown in FIG. 7D, the above-described relationship between the position of the incident aperture and the aperture area may be satisfied only along one axis.

While the incident apertures having the same aperture area are arranged in a square form in FIG. 7C, they may be arranged in a polygonal form or a circular form.

According to the source grating 1 for the Talbot-Lau-type interferometer of the second embodiment, as the distance between the exit aperture and the center of the source grating increases, the intensity of X-ray exiting from the exit aperture increases. This improves the contrast in a peripheral portion of an obtained contrast image.

In contrast to the second embodiment, the incident apertures of all channels may have the same area and the exit apertures may have the same area, as shown in FIG. 1 or 2. In this case, the intensities of X-rays exiting from the channels are substantially uniform.

Third Embodiment

In the present invention, the aperture area of each incident aperture of the channel 4 is different from the aperture area of the corresponding exit aperture, as described above. For this reason, the cross-sectional area of the channel 4 on a cross section of the guide tube 3 taken between the surface ABCD and the surface EFGH and parallel to at least one of the surfaces ABCD and EFGH differs according to the position of the cross section of the guide tube 3.

Figure 8A:
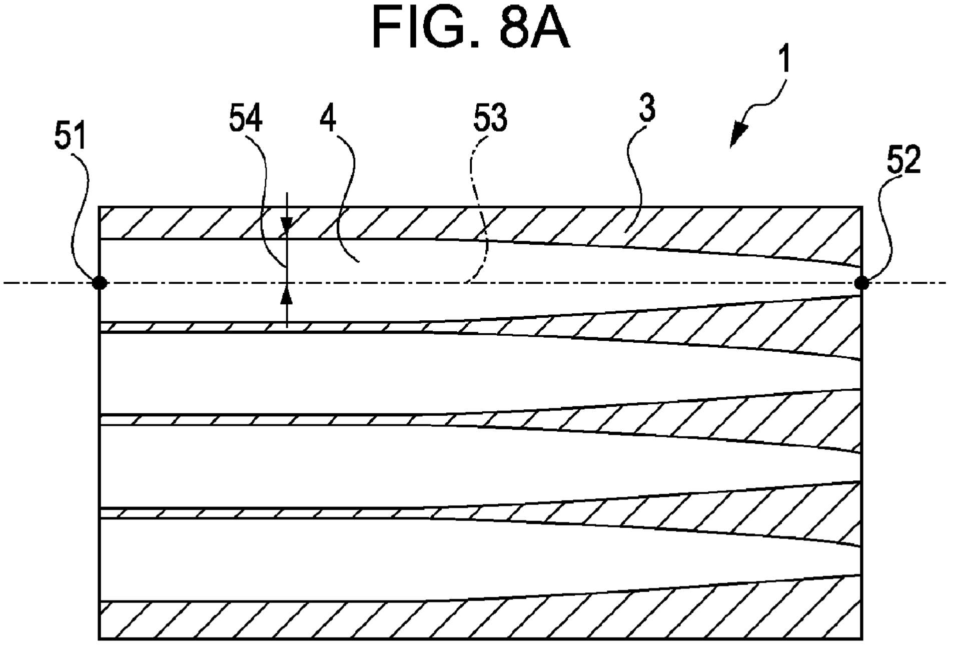
FIGS. 8A and 8B are schematic sectional views of guide tubes illustrating structures of inner surfaces of channels in source gratings according to a third embodiment of the present invention and a modification of the third embodiment.

FIG. 8A is a schematic sectional view of a guide tube 3 including a channel axis 53 passing through centers 51 and 52 of incident and exit apertures, respectively, of a channel 4. In the channel 4, the shortest distance 54 in a section perpendicular to the channel axis 53 from a certain point on the channel axis 53 to an inner surface of the channel 4 differs according to the position of the certain point on the channel axis 53.

While the first embodiment, the first modification of the first embodiment, and the second embodiment adopt the shape of the channel 4 such that the shortest distance 54 decreases in proportion to the distance from the incident aperture, the present invention is not limited to this shape. For example, the shortest distance 54 may continuously and monotonously decrease as the position moves from the center 51 of the incident aperture toward the center 52 of the exit aperture. In this case, the shortest distance 54 may decrease in proportion to the distance from the center 51 of the incident aperture, as shown in FIG. 1, or in accordance with the power of the distance to the center 52 of the exit aperture, as shown in FIG. 8A. Although not shown, the channel 4 may include a portion in which the shortest distance 54 from the channel axis 53 to the inner surface of the channel 4 is fixed, regardless of the distance from the center 51 of the incident aperture.

The fact that the shortest distance 54 from a certain point on the channel axis 53 to the inner surface of the channel changes according to the position on the certain point on the channel axis 53 means that the angle of the inner surface of the channel 4 with respect to the channel axis 53 or the curvature of the inner surface changes. By changing the angle or curvature, the focal length of the X-ray beam 12 exiting from the exit aperture of the channel 4 can be arbitrarily controlled, and the divergent angle of the X-ray beam 12 can be controlled.

Hence, the source grating for the Talbot-Lau-type interferometer of the third embodiment can achieve a high X-ray transmittance and a wider viewing angle.

Modification of Third Embodiment

Figure 8B:
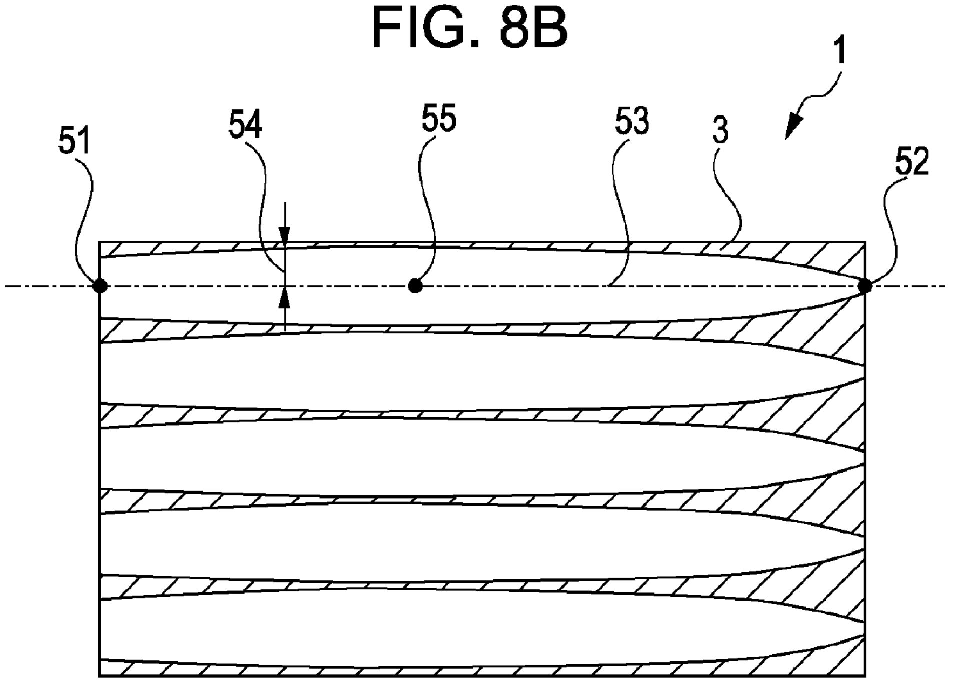

FIG. 8B illustrates another sectional shape of a channel such that a base point 55 is determined on a channel axis 53. Between a center 51 of an incident aperture and the base point 55, the shortest distance 54 from a point on the channel axis 53 to the inner surface of the channel increases as the distance from the center 51 of the incident aperture increases. Between the base point 55 and a center 52 of an exit aperture, the shortest distance 54 from the point on the channel axis 53 to the inner surface of the channel decreases as the distance from the center 51 of the incident aperture increases. That is, the shortest distance 54 in the section perpendicular to the channel axis 53 increases and then decreases as the distance from the center 51 of the incident aperture to the point on the channel axis 53 increases. While the shortest distance 54 first increases and then decreases from the base point 55 in FIG. 8B, it may be fixed in a certain area.

Figure 9:
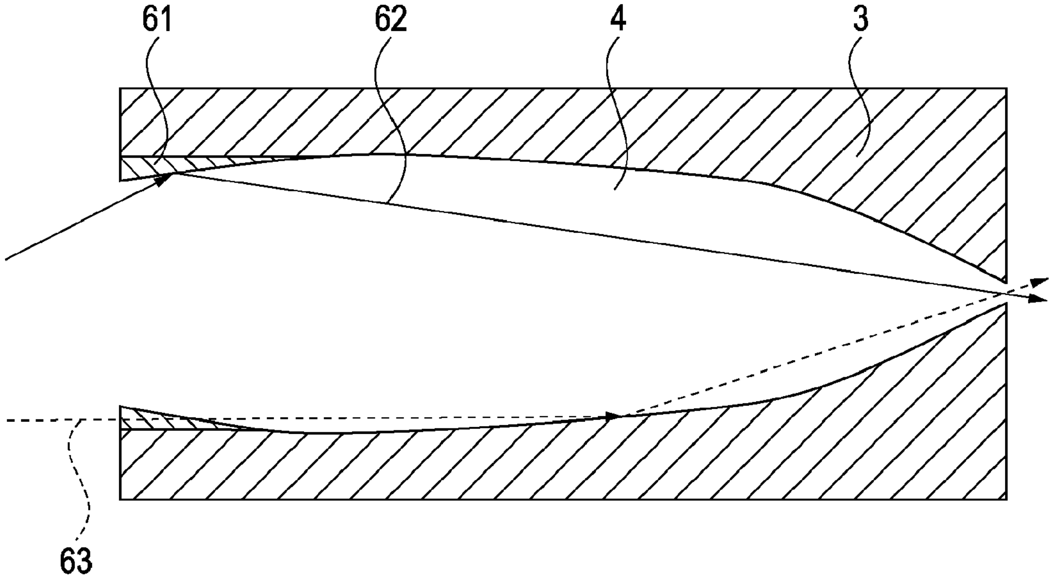
FIG. 9 illustrates a cross-sectional shape of a channel and optical paths of X-ray beams in the modification of the third embodiment.

FIG. 9 illustrates a section of a channel 4 and optical paths of X-ray beams incident on the channel 4. A section of a portion just behind an incident aperture is narrowed by a region 61, in contrast to a case in which the section just behind the incident aperture is parallel. While the region 61 is shown with a pattern different from that of the other region of a guide tube 3 for convenience, these regions may be provided integrally.

While an X-ray beam (a solid line 62), which enters the guide tube 3 without being totally reflected when the section just behind the incident aperture is parallel, is totally reflected by the region 61, and therefore, is guided to an exit aperture. In contrast, while an X-ray beam (a broken line 63), which directly enters the channel when the region 61 is not provided, enters the channel through the region 61, and is also guided to the exit aperture.

Such a channel shape, as shown in FIGS. 8 and 9, increases the X-ray capture angle at the incident aperture. Therefore, according to the source grating of the Talbot-Lau-type interferometer of the modification of the third embodiment, the convergent effect of the channel 4 is further enhanced, and this achieves a higher X-ray transmittance.

Fourth Embodiment

Figure 10:
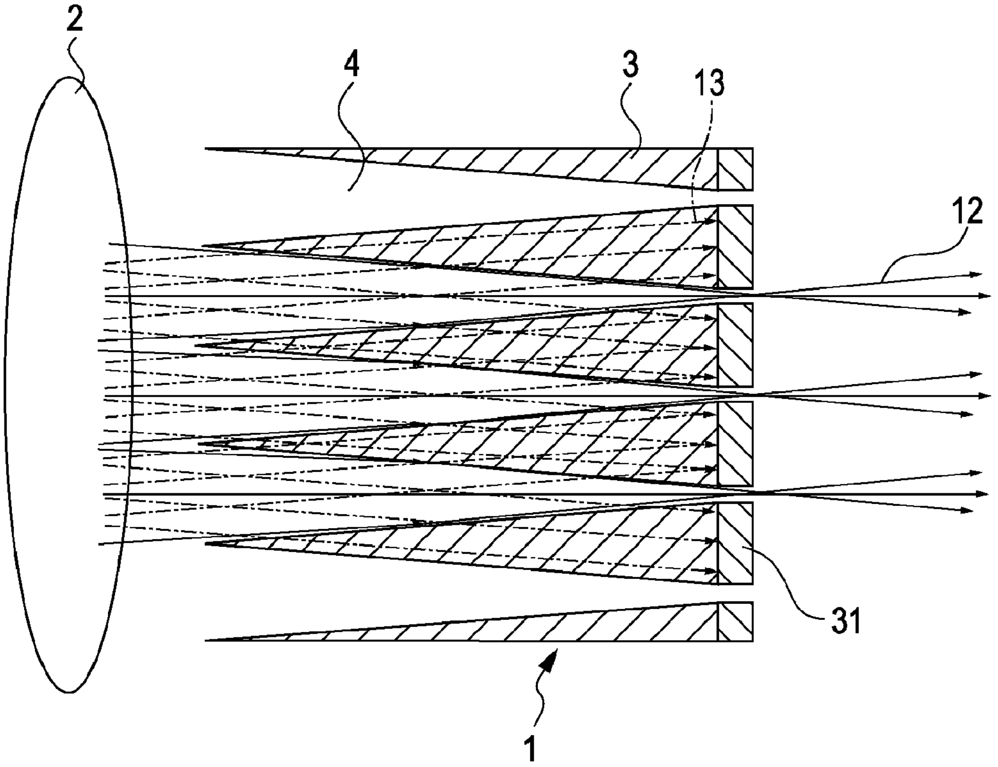
FIG. 10 is a schematic sectional view of a source grating according to a fourth embodiment of the present invention.

FIG. 10 illustrates a source grating according to a fourth embodiment of the present invention. In the source grating of the present invention, a shielding grid 31 for absorbing X-rays may be provided on a side opposite a side irradiated with the X-rays, that is, the surface EFGH shown in FIG. 2A. The shielding grid 31 may be provided over the entire surface EFGH of the source grating 1 except exit apertures 6. Alternatively, the shielding grid 31 may be provided in a part of the surface EFGH, for example, only on the peripheries of the exit apertures.

The operation of structures of a guide tube 3 and the shielding grid 31 will be described with reference to FIG. 10. Some X-ray beams 13 applied from an X-ray source 2 onto the source grating 1 enter the guide tube 3 without satisfying the condition of total internal reflection by the inner surfaces of channels 4. The incident X-ray beams 13 pass through the guide tube 3, and exit from a region of the surface EFGH except the exit apertures. These X-ray beams 13 decrease the intensity ratio of the high-intensity areas 42 and the low-intensity area 41 in the surface EFGH shown in FIG. 3C. Since the shielding grid 31 is shaped to cover the area except the exit apertures, that is, cover the low-intensity area 41, it reduces the intensity of the X-ray beams 13 entering the guide tube 3. As a result, the X-ray intensity ratio in the surface EFGH can be increased.

X-ray beams exiting from the area except the exit apertures are detected as noise. Hence, according to the source grating of the Talbot-Lau-type interferometer of the fourth embodiment, the signal to noise (S/N) ratio can be improved by the shielding grid 31 for absorbing X-rays that are not concentrated onto the exit apertures.

In the above-described third embodiment, the guide tube 3 is preferably formed of a material that easily transmits X-rays so that attenuation of X-ray beams passing through the region 61 is minimized. However, if the material of the guide tube 3 easily transmits the X-rays, the intensity of X-rays exiting from the area except the exit apertures increases. Hence, the X-ray capture angle at the incident apertures can be increased while maintaining a higher S/N ratio by adding the shielding grid 31.

Fifth Embodiment

Figure 11:
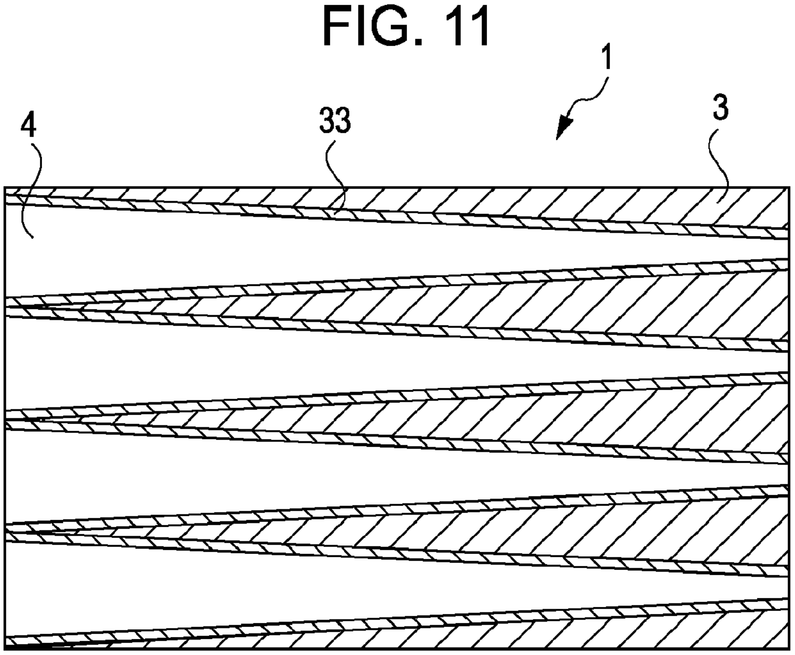
FIG. 11 is a schematic sectional view of a source grating according to a fifth embodiment of the present invention.

FIG. 11 illustrates a fifth embodiment of the present invention. As shown in FIG. 11, an inner surface of each channel 4 may be covered with a material different from the material that forms a guide tube 3.

An angle at which X-rays can be totally reflected by the inner surface of the channel 4, that is, a so-called critical angle θc (rad) depends on energy E (keV) of the X-rays and a density ρ ($g/cm^3$) of the material that forms the inner surface. The critical angle is generally given by $\theta c=0.02\times0.02\times\sqrt{\rho}\div E$. For example, when an X-ray beam having an energy 20 keV is incident on borosilicate glass, θc=1.48 mrad.

This relational expression means that the critical angle θc is small when the energy E of the X-ray beam is large. When the critical angle θc decreases, the ratio of X-ray beams 13 that enter the guide tube 3 without being reflected by the inner surface of the channel 4, to X-ray beams 11 incident on the channel 4, increases. Accordingly, the critical angle θc and the ratio of the X-ray beams totally reflected by the inner surface of the channel 4 can be increased by covering the inner surface of the channel with a material having a density ρ higher than that of the material of the guide tube 3.

According to the source grating for the Talbot-Lau-type interferometer of the fifth embodiment, since the effect of the channel for converging the X-rays is enhanced, the intensity ratio between the high-intensity area and the low-intensity area in the surface EFGH of the guide tube 3 can be increased. Further, since the ratio of X-rays exiting from the area except the exit apertures decreases, the S/N ratio can be increased further.

In the source gratings of the above-described embodiments, the channel axes passing through the centers of the incident apertures and the centers of the exit apertures are parallel in all channels. However, the channel axes of the channels do not always need to be parallel, and some of the channel axes may be nonparallel.

Figure 12:
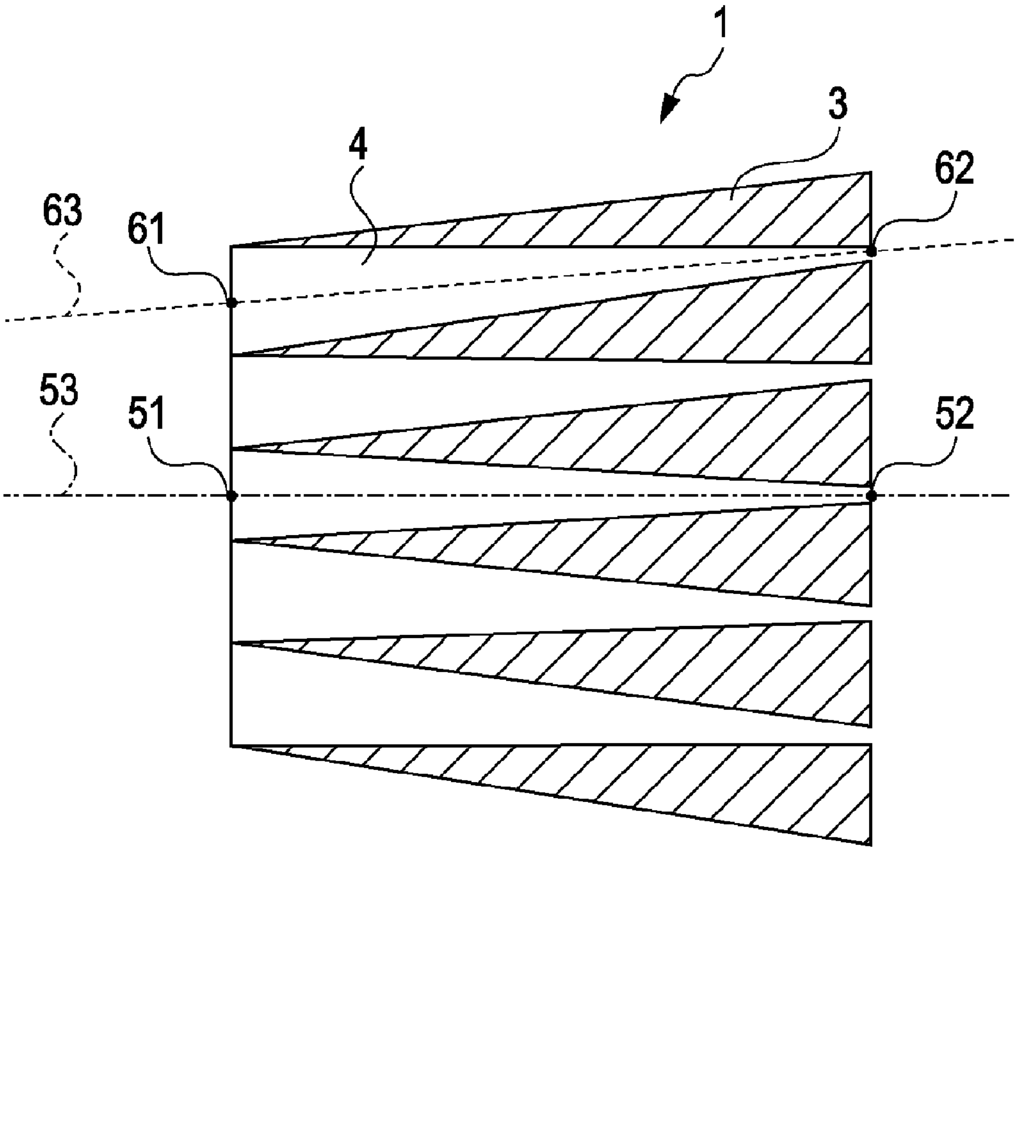
FIG. 12 is a cross-sectional view of guide tubes in which one channel axis and the other channel axis are not parallel in an embodiment of the present invention.

FIG. 12 illustrates the relationship between one channel axis 53 and the other channel axis 63 of channels 4. Referring to FIG. 12, the channel axis 53 passing through the center 51 of an incident aperture and the center 52 of an exit aperture of one channel 4 is not parallel to the channel axis 63 passing through the center 61 of an incident aperture and the center 62 of an exit aperture of the other channel 4.

In a case in which a sample 24 having a large area is irradiated with X-rays, when the other channel axis 63 extends outward toward the sample 24 relative to the channel axis 53 closer to the center of a guide tube 3, as shown in FIG. 12, X-rays can be applied over an area wider than when the channel axes 53 and 63 are parallel to each other.

In the source grating of the Talbot-Lau-type interferometer according to the present invention, a filter 32 for decreasing the X-ray intensity less than or equal to an arbitrary energy may be provided on an end face of the guide tube 3 having the incident aperture or the exit aperture of the channel 4, for example, on the surface EFGH shown in FIG. 1. Since all X-rays having energies do not contribute to Talbot-Lau interference, X-rays that do not contribute to interference are removed by the filter 32, so that the S/N ratio of the X-ray detector can be increased.

One or both of the shielding grid 31 and the filter 32 may be provided on the surface EFGH of the guide tube 3. When both the shielding grid 31 and the filter 32 are provided, the shielding grid 31 may be in contact with the surface EFGH or the filter 32 may be in contact with the surface EFGH.

CALCULATION EXAMPLE

Next, a description will be given of a calculation example for a source grating according to an embodiment of the present invention.

In the present invention, the X-ray intensity detected by the X-ray detector 23 is obtained by adding the intensities of X-rays passing through the channels of the source grating 1. This addition needs to be performed in consideration of spreading on the X-ray detector 23 of an X-ray beam passing through a single channel, and geometric arrangements such as the pitch, axis angle, and slit pitch of the source grating that satisfies the condition of Talbot-Lau interference.

Accordingly, a calculation was made for an X-ray beam passing through a single channel.

As calculation models of source gratings, two source gratings were prepared. One source grating is a comparative example, and is made of Au, has a thickness of 50 μm, and includes pin holes with a diameter of 50 μm. The other source grating includes a combination of Au channels having an incident-aperture diameter of 750 μm, an exit-aperture diameter of 50 μm, and a length of 10 cm and an Au shielding grid having a diameter of 50 μm. The diameter of the channels changes in proportion to the position on the optical axis. The distance between each of the source gratings and an X-ray source was set at 20 cm corresponding to a normal distance between the focal point of an X-ray tube and an X-ray window. Further, the distance between each of the source gratings and an X-ray detector was set at 50 cm.

Figure 15:
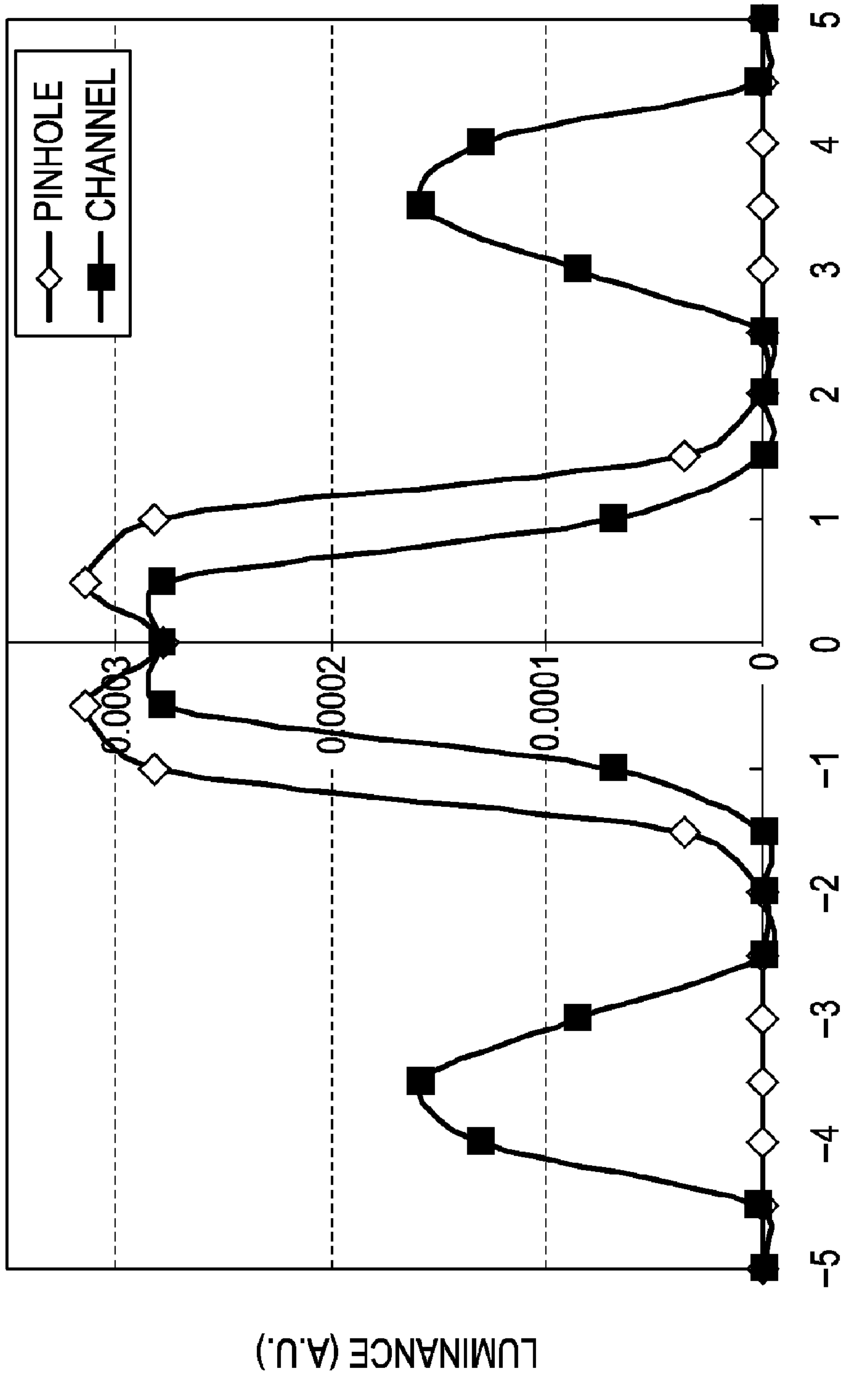
FIG. 15 illustrates a calculation example of a source grating of the present invention.

FIG. 15 illustrates calculation results, and shows the illuminance at a certain line on the X-ray detector 23 intersecting the optical axis of the source grating. Open rhombuses indicate a calculation example of the pinholes (comparative example), and solid squares indicate a calculation example in accordance with at least one embodiment of the present invention.

In the comparative example, the area irradiated with the X-rays is within a range of ±2 mm. In contrast, in the calculation example in accordance with at least one embodiment of the present invention, peripheral areas are irradiated with X-rays in addition to the center irradiated area. For this reason, according to at least one embodiment of the present invention, the illuminance on the entire surface of the X-ray detector 23 could be three times the illuminance in the comparative example.

FIRST PRODUCTION EXAMPLE

Next, a description will be given of a production example of a one-dimensional source grating in the Talbot-Lau-type interferometer of the present invention.

Figure 13A:
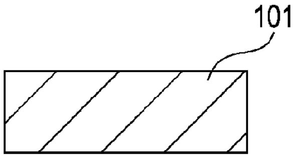
FIGS. 13A to 13G' illustrate a production procedure for a one-dimensional source grating according to the present invention.
Figure 13B:
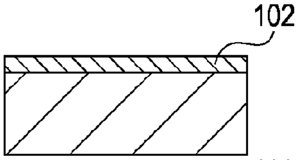

FIGS. 13A to 13G' illustrate exemplary steps of a production process for a guide tube 3. On one surface of a double-sided polished silicon wafer 101 having a diameter of four inches and a thickness of 250 μm, a hard mask layer 102 having a thickness of 200 nm is formed of, for example, chrome by evaporation (FIG. 13B). The hard mask layer 102 may be formed by physical vapor deposition such as sputtering, instead of evaporation.

Figure 13C:
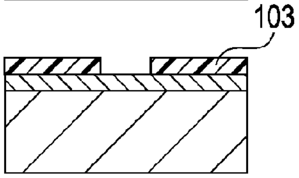

After a photoresist layer is formed on the hard mask layer 102, a resist pattern 103 shown in the guide tube 3 of FIG. 11 is formed in an area of 60 mm square by photolithography (FIG. 13C). In the resist pattern 103 of this production example, a plurality of isosceles triangles having a base length of 90 μm and a height of 60 mm are arranged at a pitch of 120 μm in a manner such that the bases are aligned and apexes opposing the bases are aligned.

Figure 13D:
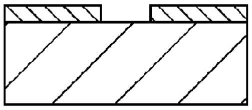

Next, the resist pattern 103 is transferred onto the hard mask layer 102 by reactive ion etching (FIG. 13D). After transfer, the resist pattern 103 may be removed or may be left.

Figure 13E:
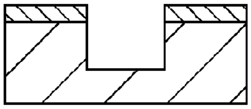
Figure 13E:
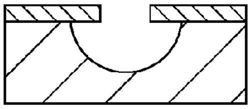

Subsequently, the silicon wafer 101 is etched to a depth of 100 μm along the hard mask layer 102 with the transferred pattern by a so-called Bosch process for alternately performing reactive ion etching and deposition of a side-wall protective layer (FIG. 13E). When irregularities are formed on side walls of a groove formed in the silicon wafer 101, they may be reduced by repeating wet thermal oxidation of silicon and removal of an oxide film a plurality of times. Etching may be performed, for example, by anisotropic dry etching, such as a Bosch process, or anisotropic wet etching using a potassium hydroxide solution. Alternatively, etching may be performed, for example, by isotropic dry etching using fluorine plasma, or isotropic wet etching using a mixed solution of hydrofluoric acid and nitric acid (FIG. 13E'). When the silicon wafer 101 is etched by isotropic etching, since underetching proceeds under the hard mask layer 102, it is preferable to estimate the underetching rate beforehand and to adjust the resist pattern 103 in accordance with the underetching rate.

After etching, the hard mask layer 102 is removed, and the area having the pattern of 60 mm square is separated from the silicon wafer 101 by a dicing saw or the like.

Figure 13F:
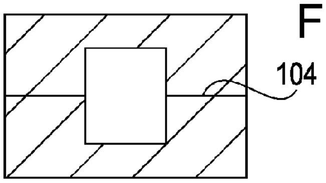
Figure 13F:
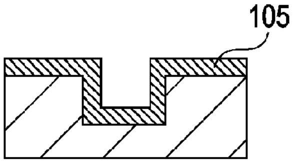

One more silicon wafer 101 of 60 mm square that is similarly patterned is formed. Two silicon wafers 101 are aligned with surfaces 104 having grooves facing each other and are adjusted so that the grooves are aligned by an aligning device equipped with an infrared camera or an X-ray camera. Then, the silicon wafers 101 are joined to form a guide tube 3 having a channel 4 (FIG. 13F).

Figure 13G:
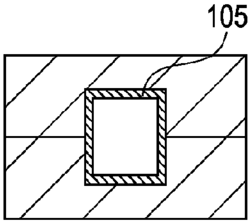
Figure 13G:
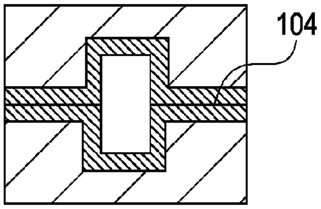

After a seed layer is next formed by electroless plating, a metal layer 105 having a thickness of 500 nm and made of, for example, gold is formed as an inner-surface covering material 33 on an inner surface of the channel 4 (FIG. 13G). Although, when gold is deposited on the inner surface of the channel 4, it is also similarly deposited on an end face of the guide tube 3, a metal layer 105 on the end face functions as shielding grid 31. The metal layer 105 may be formed before joining the silicon wafers 101. Alternatively, a gold layer having a thickness of 500 nm is formed on the silicon wafer 101, from which the hard mask layer 102 is removed, by evaporation as an example (FIG. 13F'). In this case, an area that is not made of gold may be formed for alignment on the surface of the silicon wafer 101. Two silicon wafers 101 with the gold layers 105 are positioned in a manner such that the channels face each other, and are joined by gold-to-gold interconnection, so that a guide tube 3 including 500 channels 4 each having an incident aperture of 200×120 μm and an exit aperture of 200×29 μm is obtained.

Finally, for example, a molybdenum foil having a thickness of 100 μm is bonded as a filter 32 to an emitting end face of the guide tube 3, thereby obtaining a one-dimensional source grating.

The one-dimensional source grating 1 of the Talbot-Lau-type interferometer thus produced is placed just behind an X-ray source 2, as shown in FIG. 1. An X-ray phase grating 21 has a slit structure formed in a silicon wafer in which convex portions have a line width of 1.968 μm and concave portions have a line width of 1.968 μm and a depth of 23 μm. An absorption grating 22 has a slit structure formed in a silicon wafer in which convex portions have a line width of 1 μm and concave portions have cavities of 1 μm and a depth of 20 μm and the cavities are filled with gold by gold plating. The phase grating 21 and the absorption grating 22 are arranged in a manner such that slit pitch directions coincide with each other and the distance d therebetween coincides with the Talbot distance zt. A sample 24 is placed before the phase grating 21, and an X-ray detector 23 is placed just behind the absorption grating 22. When imaging is performed with an X-ray energy of 17.7 keV (0.7 angstrom), the Talbot distance zt is set at 28 mm under the first Talbot condition (n=1). Further, under the Talbot-Lau condition given by Expression (3), the distance L between the source grating 1 and the phase grating 21 needs to be 1684 mm.

When a one-dimensional diffraction grating is used, imaging is performed five times while shifting the diffraction grating in the pitch direction by ⅕ of the pitch of the absorption grating 22. A differential phase image thereby obtained can be converted into a phase retrieval image by being integrated in the pitch direction of the diffraction grating.

SECOND PRODUCTION EXAMPLE

Next, a description will be given of a production example of a two-dimensional source grating in a Talbot-Lau-type interferometer according to the present invention.

In the second production example, channels 4 are formed in a double-sided polished silicon wafer 101 having a thickness of 250 μm by a process similar to that adopted in the first production example. Grooves serving as the channels 4 are formed in either surface of the silicon wafer 101. In a resist pattern 102, a plurality of trapezoids having an upper base length of 110 μm, a lower base length of 119 μm, and a height of 60 mm are arranged at a pitch of 120 μm in a manner such that upper bases are aligned and lower bases are aligned.

After a patterned hard mask layer 102 is formed on each surface of the silicon wafer 101, the silicon wafer 101 is etched to a depth equal to the aperture width of the hard mask layer 102 by anisotropic etching. The speeds of anisotropic etching and isotropic etching change according to the aperture width of the hard mask layer 101. When the conditions, such as the density of ions that contribute to etching and the temperature, do not change, the etching speed is high when the aperture width is large, and is low when the aperture width is small. By using this, for example, anisotropic etching is performed under a condition such that the depth is 10 μm when the aperture width is 10 μm and the depth is 1 μm when the aperture width is 1 μm. After that, a groove having a semicircular cross section is formed by isotropic etching, as shown in FIG. 13E'. For example, the groove is formed to have a depth of 60 μm when the aperture width is 10 μm, and a depth of 15 μm when the aperture width is 1 μm.

Figure 14:
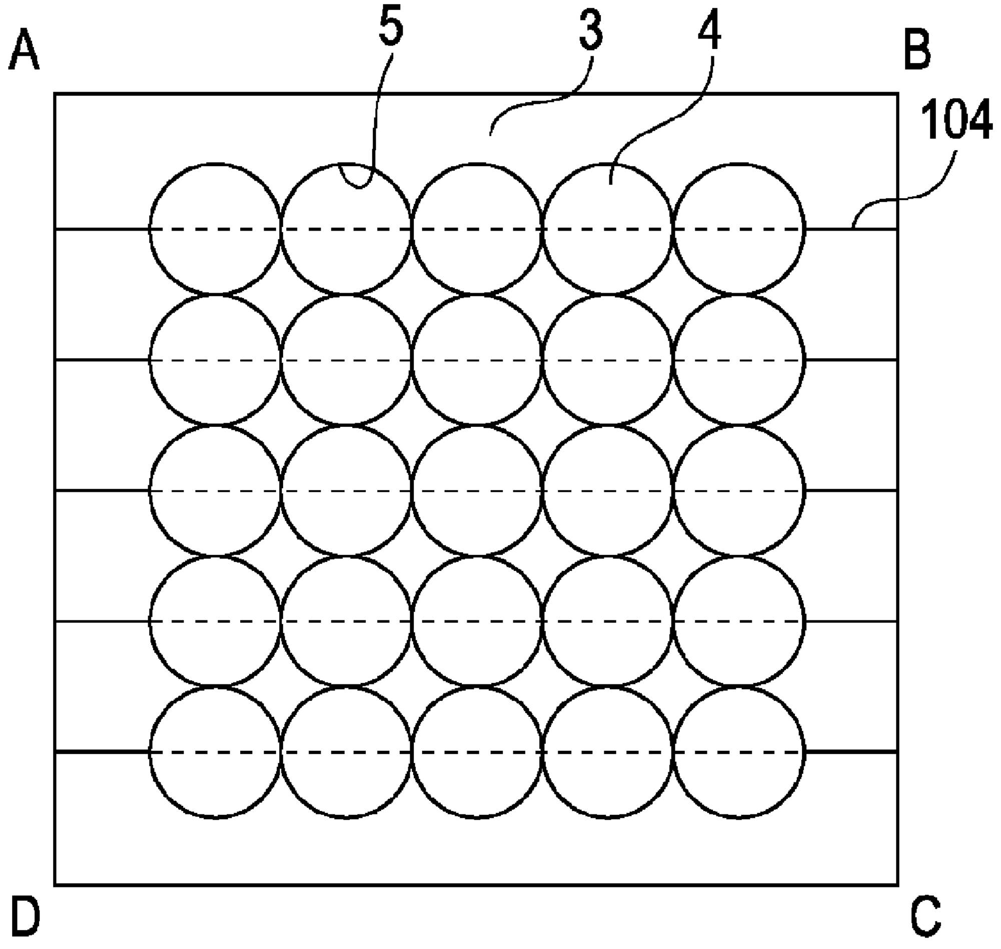
FIG. 14 illustrates a production procedure for a two-dimensional source grating according to the present invention.

After grooves are respectively formed in both surfaces of the silicon wafer 101, the hard mask layers 102 are removed. At least two silicon wafers 101 are formed, and joint, formation of metal layers 105, and formation of filters 33 are performed similarly to the first production example, thereby obtaining a two-dimensional source grating. When forming the two-dimensional source grating, a plurality of silicon wafers 101 are all joined in a stacked manner, as shown in FIG. 14.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-096141 filed Apr. 10, 2009, which is hereby incorporated by reference herein in its entirety.

What is claimed is:

1. A source grating for a Talbot-Lau-type interferometer, comprising:

a plurality of channels including incident apertures provided on a side irradiated with X-rays and exit apertures provided on an opposite side of the side irradiated with the X-rays, the exit apertures having an aperture area smaller than an aperture area of the incident apertures, wherein the exit apertures of the channels are arranged at a pitch Po that satisfies the following expression:

$$Po=n\times Ps\times(L/d)$$

where Ps represents a pitch of interference fringes of a Talbot self-image, L represents a distance from the source grating in the Talbot-Lau-type interferometer, d represents a distance from the phase grating to an absorption grating in the Talbot-Lau-type interferometer, and n is an arbitrary natural number.

2. The source grating according to claim 1, wherein the incident apertures of all the channels have the same aperture area, and the exit apertures of all the channels have the same aperture area.

3. The source grating according to claim 1, wherein each of the plurality of channels includes a portion in which a distance from a point on an axis passing through the center of the incident aperture and the center of the exit aperture to an inner surface of the channel in a cross section perpendicular to the axis changes according to a distance from the incident aperture to the cross section.

4. The source grating according to claim 3, wherein the distance from the point on the axis to the inner surface first increases and then decreases as the distance from the incident aperture to the cross section increases.

5. The source grating according to claim 3, wherein the distance from the point on the axis to the inner surface monotonously decreases as the distance from the incident aperture to the cross section increases.

6. The source grating according to claim 1, further comprising:

a radiation absorbing member provided in an area other than the exit apertures of the channels.

7. The source grating according to claim 1, wherein inner surfaces of the channels are covered with a material having a density higher than a density of a material that forms the channels.

8. The source grating according to claim 1, wherein each of the plurality of channels concentrates an intensity of the X-rays from a first intensity distribution at the incident apertures to a second intensity distribution at the exit apertures such that the intensity per unit area of the X-rays passing through the exit apertures is larger than the intensity per unit area of the X-rays passing through the incident apertures.

9. The source grating according to claim 1, wherein the plurality of channels includes at least a first group of channels and a second group of channels, the incident aperture of the second group of channels having an aperture area larger than an aperture area of the incident aperture of the first group of channels, and wherein the second group of channels is located farther from a center of the side irradiated with the X-rays than the first group of channels so that illuminance at a peripheral portion of an image formed by alignment of the Talbot-Lau-type self-images is higher than when aperture areas of all the channels are equal to each other.

10. A source grating for a Talbot-Lau-type interferometer, comprising:

a plurality of channels, including incident apertures provided on a side irradiated with X-rays and exit apertures provided on an opposite side of the side irradiated with the X-rays, the exit apertures having an aperture area smaller than an aperture area of the incident apertures, wherein the plurality of channels includes at least a first channel and a second channel, the incident aperture of the second channel having an aperture area larger than an aperture area of the incident aperture of the first channel, and wherein the second channel is located farther from a center of the side irradiated with the X-rays than the first channel.

11. The source grating according to claim 10, wherein the exit apertures of the channels are arranged so that interference fringes of Talbot self-images formed by X-rays exiting from the exit apertures of the adjacent channels are aligned with each other.

12. The source grating according to claim 10, wherein illuminance at a peripheral portion of an image formed by alignment of the Talbot-Lau-type self-images is higher than when aperture areas of all the channels are equal to each other.

13. The source grating according to claim 10, wherein each of the plurality of channels includes a portion in which a distance from a point on an axis passing through the center of the incident aperture and the center of the exit aperture to an inner surface of the channel in a cross section perpendicular to the axis changes according to a distance from the incident aperture to the cross section.

14. The source grating according to claim 10, further comprising:

a radiation absorbing member provided in an area other than the exit apertures of the channels.

15. The source grating according to claim 10, wherein inner surfaces of the channels are covered with a material having a density higher than a density of a material that forms the channels.

16. The source grating according to claim 10, wherein each of the plurality of channels concentrates an intensity of the X-rays from a first intensity distribution at the incident apertures to a second intensity distribution at the exit apertures such that the intensity per unit area of the X-rays passing through the exit apertures is larger than the intensity per unit area of the X-rays passing through the incident apertures.

17. A Talbot-Lau-type interferometer comprising:

a phase grating configured to spatially and periodically modulate phases of X-rays emitted from a radiation source;

an X-ray detection unit configured to detect the X-rays passing through the phase grating; and a source grating provided between the radiation source and the phase grating, wherein the source grating includes a plurality of channels including incident apertures provided on a side irradiated with X-rays and exit apertures on an opposite side of the side irradiated with the X-rays, the exit apertures having an aperture area smaller than an aperture area of the incident apertures, and wherein the exit apertures of the channels are arranged so that interference fringes of Talbot self-images formed by the X-rays exiting from the exit apertures of the adjacent channels are aligned with each other.

18. The Talbot-Lau-type interferometer according to claim 17, further comprising:

an absorption grating in which absorbing portions configured to absorb the X-rays and transmitting portions configured to transmit the X-rays are periodically arranged, the absorption grating being provided between the phase grating and the X-ray detecting unit.

* * * * *